April 23, 1968     A. H. YOUMANS     3,379,884
METHOD AND APPARATUS FOR NEUTRON LIFETIME WELL LOGGING
Filed June 10, 1954     3 Sheets-Sheet 1

INVENTOR.
ARTHUR H. YOUMANS
BY
Robert K. Schumacher
ATTORNEY

INVENTOR.
ARTHUR H. YOUMANS
BY Robert K. Schumacher
ATTORNEY

April 23, 1968  A. H. YOUMANS  3,379,884
METHOD AND APPARATUS FOR NEUTRON LIFETIME WELL LOGGING
Filed June 10, 1954  3 Sheets-Sheet 3

INVENTOR.
ARTHUR H. YOUMANS
BY
Robert K. Schumacher
ATTORNEY

United States Patent Office 3,379,884
Patented Apr. 23, 1968

3,379,884
METHOD AND APPARATUS FOR NEUTRON LIFETIME WELL LOGGING
Arthur H. Youmans, Tulsa, Okla., assignor, by mesne assignments, to Dresser Industries, Inc., Dallas, Tex., a corporation of Delaware
Filed June 10, 1954, Ser. No. 435,698
64 Claims. (Cl. 250—83.3)

This invention relates to the art of geophysical prospecting in general and to the art of radioactivity well logging in particular and more particularly to such logging wherein the lifetime of neutrons in the formations is measured.

Radioactivity well logging is conventionally of two sorts, natural gamma ray logging and neutron logging. Neutron well logging is conventionally performed by traversing a well with a radium-beryllium source of energetic neutrons, thereby continuously irradiating the formations penetrated by the well with fast neutrons, and simultaneously measuring and recording the number of neutrons or gamma rays returning to the well as a result of such irradiation.

An improvement in neutron well logging shown in the prior art utilizes a periodically varying neutron source whereby the neutron irradiation of the formations is periodically cut off. Such a source comprises a material emitting alpha particles with a disc rotating beside it having alternate sectors made of material emitting neutrons when exposed to alpha particles. The disc is rotated to turn the neutron source off and on at an audio frequency. A continuously operating detector detects secondary radiation emitted from the formations as a result of the irradiations, and the audio frequency component in the detection signal is amplified and recorded to the exclusion of any constant detection signal related to the natural gamma radiation. In the instant invention, not only the neutron source but also the detecting system is periodically varied.

It is known in the prior art to irradiate the formations for a period of time sufficient to activate an appreciable number of nuclei of material in the formations, thereby rendering the material artificially radioactive, and at an interval of time following the cessation of irradiation to measure this artificial radioactivity. The time is related to half life of the activated material and is of the order of minutes or seconds for such of the common elements of the earth as are activated appreciably by this means. This may be accomplished by causing the source to be turned on and off at a frequency related to half life and detecting continuously or the detector may follow a continuously emitting neutron source through the well at such spacing and rate as to cause the detector to arrive at a particular point in the well a predetermined interval after irradiation. In the instant invention the period of the periodically varying source and detector system is related not to the half life of the irradiated material but to the lifetime of the neutrons in the formations, that is, to the time needed for fast neutrons emitted from the source to be slowed and captured. This time is of the order of 200 microseconds.

In the instant invention the formations are irradiated with neutrons from a periodically varying source operating at a frequency of the order magnitude of 2,500 cycles per second, being thus alternately on and off for periods of 200 microseconds. A detecting system is synchronized with the source to operate while the source is off. The radiation detected may be either slow neutrons or gamma rays which result from thermal neutron capture; in either case the signal is related to the population of thermal neutrons. From the time the source is turned off the slow neutrons are gradually captured and detection per unit time decreases until the source is again turned on. By measuring the number of thermal neutrons present at any particular time the rate of decay of the thermal neutron population may be measured. This rate of decay is dependent upon the nuclei of the material present in the formations and varies from formation to formation. This rate of decay is related to the time required for these nuclei to capture slow neutrons and for the thermal neutrons to diffuse away; therefore, the measurement is related to this time and hence to the lifetime of the neutrons in the formations and to the albedo of the formations.

Therefore, the principal object of this invention is to provide method and apparatus for determining the lifetime of neutrons in the formations about a borehole. It is a further object of this invention to provide method and apparatus for neutron well logging based on the lifetime of neutrons in the formations. Other objects and advantages will become apparent from the following detailed description, when considered with the accompanying drawings, in which:

Figures 1, 2, 3:
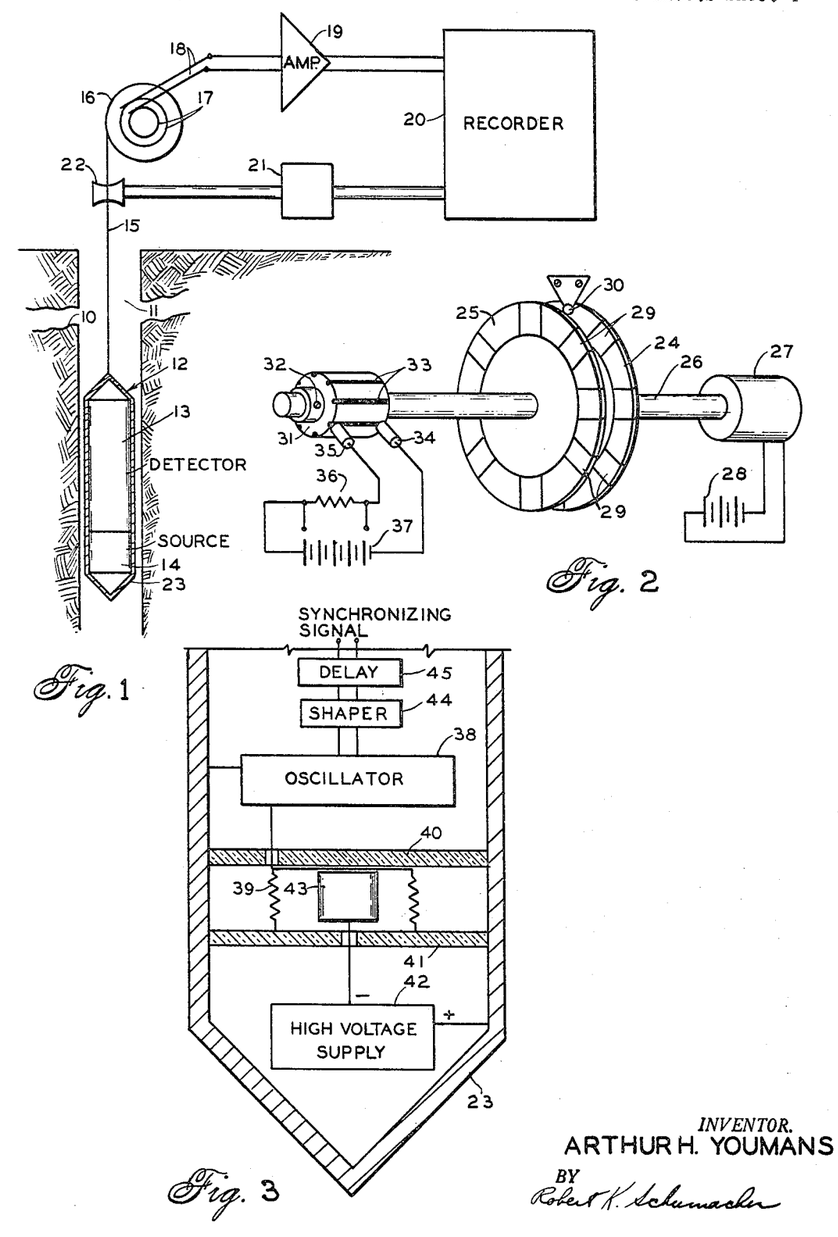
FIGURE 1 is a diagrammatic illustration of a radioactivity well logging operation.
FIGURE 2 is an illustration of a periodic neutron source.
FIGURE 3 is a sectional view of another form of periodic neutron source.

Referring to the drawings in detail, particularly FIGURE 1, there is illustrated schematically a radioactivity well surveying operation in which a portion of the earth's surface 10 is shown in vertical section. A well 11 penetrates the earth's surface and may or may not be cased. Disposed within the well is subsurface instrument 12 of the well logging system. Subsurface instrument 12 comprises a detecting system 13 and a neutron source 14. Cable 15 suspends the instrument in the well and contains the required conductors for electrically connecting the instrument with the surface apparatus. The cable is wound on or unwound from drum 16 in raising and lowering the instrument 12 to traverse the well.

In making a radioactivity log of a well, instrument 12 is caused to traverse the well. Thereby neutrons from source 14 irradiate the formations surrounding the borehole and radiations influenced by the formations are detected by detecting system 13. The resultant signal is sent to the surface through cable 15. Through slip rings 17 and brushes 18 on the end of the drum, the signal may be conducted to amplifier 19 for amplification. The amplified signal is conducted to recorder 20 and recorded. Recorder 20 is driven through a transmision 21 by measuring reel 22 over which cable 15 is drawn so that recorder 20 moves in correlation with depth as instrument 12 traverses the well. The elements are shown diagrammatically, and it is to be understood that the associated circuits and power supplies are provided in a conventional manner. Amplifier 19 may be included in the subsurface instrument, or amplification may be effected both on the surface and in the subsurface instrument. It is also to be understood that the instrument housing 23 will be constructed to withstand the pressures and mechanical and thermal abuses encountered in logging a deep well and provide adequate space within it to house the necessary apparatus and permit the transmission of radiation through it.

In FIGURE 2 there is illustrated one form of the source 14 comprising a pair of discs 24 and 25 both mounted on the shaft 26 and driven by a motor 27 powered by any suitable source such as a battery 28. In the outer edges of these discs alternate sectors 29 are provided of a material which will produce neutrons upon bombardment by alpha particles, for example, beryllium or boron or some composition containing one or more of these metals either as metals or in the form of their salts or other compounds. A source of alpha particles 30, which may be actinium, radium or polonium or their compounds, is then suspended between the outer edges of the two discs and the discs are rotated by the action of the motor. When the neutron generating sections of the two discs are beside the source of alpha particles, neutrons are generated, but when they pass on and the other portion of the discs come beside the alpha particle source, substantially no neutrons are generated, for the remainder of the disc is made of iron or lead or some other material that does not generate neutrons upon being bombarded with alpha particles. Obviously, the discs 24 and 25 can be shaped in any way desired to receive the maximum radiation possible from the source of alpha particles; that is, they can be shaped so as nearly to surround the alpha particle source, if so desired. Commutator 31 is also mounted on shaft 26. It is held in place by set screw 32 and hence may be arranged in any desired position on shaft 26. Commutator 31 is comprised of conducting bars 33 spaced by insulation. There is one bar for each pair of sectors 29 and the position of the bars relative to the sectors may be adjusted by moving the position of the commutator relative to shaft 26 and clamping the commutator in the new position with set screw 32. Brushes 34 and 35 are urged against the periphery of commutator 31. As the commutator rotates, bars 33 electrically connect the brushes 34 and 35, and thus the circuit between the brushes is alternately opened and closed in synchronism with the movement of sectors 29 by source of alpha particles 30. Resistor 36 and battery 37 are connected in series between brushes 34 and 35. As the shaft 26 rotates, a voltage appears across resistor 36 in synchronism with the movement of the sectors 29 by alpha particle source 30 and hence in synchronism with the emission of neutrons. Shaft 26 is rotated to produce periodic neutron emission at the desired frequency.

In FIGURE 3 there is illustrated another form of the source 14 comprising a deuterium-tritium reactor and associated circuits within housing 23. Oscillator 38 produces a periodic voltage which may be squarewave and 2,000 volts. This voltage is applied between grid 39 and the housing 23. This periodically accelerates the electrons and ions in the region therebetween and ionizes the deuterium gas which is confined by insulators 40 and 41 and the housing 23. High voltage source 42 is of the order of 200,000 volts. It is applied between central target electrode 43 and the housing with the target electrode negative. The target electrode 43 contains tritium. Deuterium ions are accelerated from the region between grid 29 and housing 23 against the tritium in the target electrode 43 at high speed. The deuterium ions react with the tritium nuclei to release high energy neutrons of approximately 14 mev. The periodic voltage supplied by oscillator 38 creates ionization periodically and hence causes the neutrons to be emitted periodically at the same frequency. A secon output of oscillator 38 is applied to shaper 44 which is a conventional circuit providing an output of particular pulse height and pulse length, as desired. The output of shaper 44 is passed through delay circuit 45, the output of which is thereby delayed a desired amount from the output of oscillator 38 as applied to pulse the neutron source. This voltage may be used in the fashion of voltage across resistor 36 to synchronize a detecting system, for this voltage is in synchronism with the neutron source.

Figure 4:
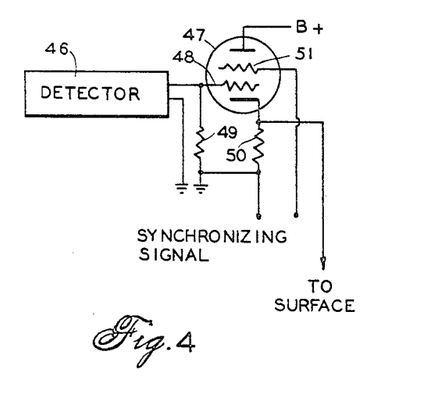
FIGURE 4 is a diagrammatic illustration of a detecting system showing means for synchronization with the neutron source.

In FIGURE 4 is shown one form of the detecting system 13 including means for turning the detecting system on and off in synchronism with the neutron source. Detector 46 is a conventional transducer of radiation converting the incident gamma rays or neutrons into electrical signals. The only requirement of this detector is that its time constant be less than the portion of the cycle during which the detecting system is on. It may be a conventional scintillation counter. It is to be understood that the necessary power supplies, amplifiers and pulse height discriminator are included with the detector 46. The output of detector 46 is coupled to the cable 15 through vacuum tube 47 and a cathode follower circuit and is sent to the surface of the earth through the cable 15 to be recorded. Tube 47 acts to turn the detecting system on and off in synchronism with the neutron source. The detector output is applied to grid 48 of tube 47 across input resistor 49. The output appears across cathode resistor 50. The synchronizing signal from delay circuit 45 of FIGURE 3 or across resistor 36 of FIGURE 2 is applied to grid 51 of tube 47 and operates to turn the tube on and off in synchronism with the neutron source.

Figure 5:
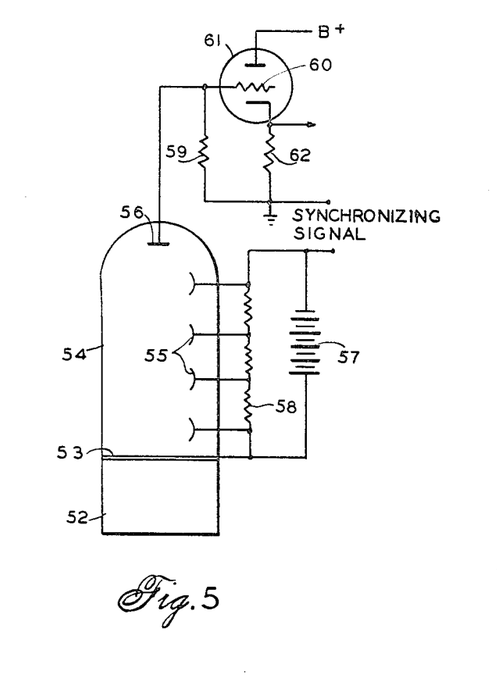
FIGURE 5 is a diagrammatic illustration of a detecting system showing another means for synchronization with the neutron source.

In FIGURE 5 there is illustrated a detecting system employing a scintillation counter with a means for turning it on and off. Radiation impinging on scintillation medium 52 produces flashes of light which irradiate photocathode 53 of photomultiplier tube 54. The photomultiplier tube contains dynodes 55 and anode 56. Battery 57 supplies accelerating voltage to the dynodes across voltage divider 58. In operation photoelectrons emitted from photocathode 53 are accelerated to the first dynode, producing secondary electrons which are accelerated to the second dynode, where there is further secondary emission of electrons, which are further accelerated to the next dynode, and so on. The secondary electrons leaving the last dynode are collected on the anode, and the resultant electrical pulses are applied across input resistor 59 to grid 60 of tube 61. If necessary, there may be intermediate amplifier stages, but ultimately the signal is taken from a cathode-follower circuit, such as across cathode resistor 62, and applied to the cable 15. The collecting voltage between the last dynode and the anode is obtained from delay circuit 45 of FIGURE 3 or across resistor 36 of FIGURE 2. In this manner, the photomultiplier is turned on and off in synchronism with the neutron source, and the detecting system shown in FIGURE 5 is thereby synchronized with the neutron source.

Either of the forms of pulsed neutron sources shown in FIGURE 2 or 3 may be used with either of the detecting systems shown in FIGURE 4 or 5. In fact, any neutron source may be used with any detecting system so long as both may be pulsed in synchronism at a frequency related to the lifetime of neutrons in the formations. For example, the synchronizing signal may be derived in the case of the source shown in FIGURE 2 by placing an AC generator on the shaft 26 instead of the commutator 31 and associated circuits.

It is generally desirable that the length of each half cycle be long enough for equilibrium conditions to be reached; however, any longer period diminishes the efficiency, since only a certain amount of information may be obtained during each cycle and the shorter period permits more cycles and hence more accumulated information. There is no additional information obtained after equilibrium is reached. The length of time the source is on is related to the slowing down time of emitted fast neutrons and the lifetime of thermal neutrons in representative formations. The time on is selected so that the thermal neutron flux approaches equilibrium in a formation of interest. The time off is selected so that the thermal neutron population approaches zero. This is also a function of slowing down time as well as lifetime of neutrons, since there are still some fast neutrons to be slowed at the instant the source is turned off. In this mode of operation, the source is therefore on and off for approximately equal periods of time.

Each half cycle may be from 1 to 5 times the average lifetime of neutrons in the formation, if the slowing down time is small relative to the lifetime of the slow neutrons. If the slowing down time is appreciable, the time on should be 1 to 5 times the sum of average slowing down time and average lifetime in the formation of interest. Since slowing down time and lifetime vary from formation to formation and since it is often desirable to obtain information about all formations penetrated by a well, the time on may be adjusted for an average formation. The time should be as long as the longest average lifetime in any formation of interest; equilibrium will then be nearly reached in all other formations. Water is present in many formations and may be considered characteristic of an average formation. The average lifetime of thermal neutrons in water at ordinary temperatures has been found to be approximately 210 microseconds. The average slowing down time of fast neutrons in water has been found to be approximately 10 microseconds. A satisfactory time on or off is therefore of the order of magnitude of the average lifetime in water or within the limits 20 to 2000 microseconds, 100 to 500 microseconds in most formations likely to be encountered in a normal well.

Figure 6:
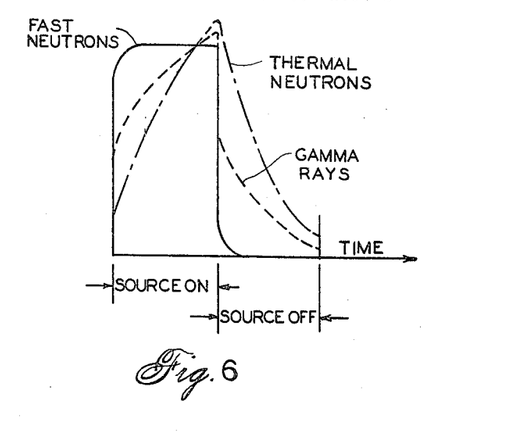
FIGURE 6 illustrates the variation of certain parameters in one cycle of operation.

In FIGURE 6 there are shown approximate wave forms for the population of fast neutrons, thermal neutrons and gamma rays in the vicinity of the instrument as a function of time for a single cycle, beginning with the time when the source is first turned on. The length of each half cycle as shown in FIGURE 6 is approximately twice the average lifetime and the average slowing down time is about 10 percent of the average lifetime. There has been no attempt to plot the curves to the same scale. An ideal source is assumed, one which may be turned on and off with infinite speed. The fast neutron population is therefore a flat-topped curve, deviating only because of the required slowing down time. Since the lifetime of the thermal neutrons is long compared with slowing down time, the thermal neutron population increases until the rate of disappearance of thermal neutrons is equal to the rate of their appearance. The gamma ray population depends upon both fast and thermal neutron populations because the gamma rays arise from both fast and thermal neutron processes. If the source is on until equilibrium is reached, the conditions are those of conventional neutron logging. These conditions depend upon fast neutron range, capture cross-section and albedo for the material of the particular formations. If the fast neutron range is long, the fast neutrons get away from the well and instrument and the populations of fast and thermal neutrons and gamma rays are low. Rapid diffusion of slow neutrons and a short lifetime have a similar effect on thermal neutron and gamma ray population only. Lifetime is inversely related to the capture cross-section. The rate of decay of the curves, following the turning off of the source, depends upon capture cross-section and albedo and not upon fast neutron range, except to the extend that slowing down time is a factor and there remain some fast neutrons.

Figure 7:
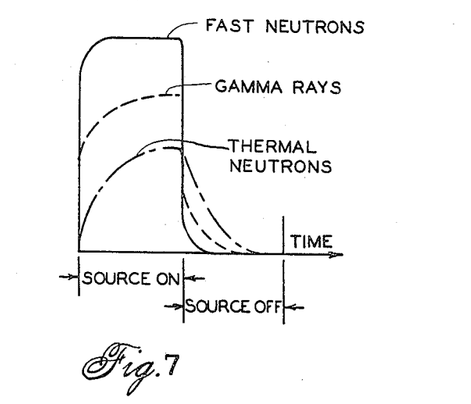
FIGURE 7 illustrates the variation of parameters for a different mode of operation.

In FIGURE 7 there are shown approximate wave forms for the population of fast neutrons, thermal neutrons and gamma rays in the vicinity of the instrument where the length of each half cycle is approximately six times the average lifetime and the average lifetime several times the slowing down time.

Figure 8:
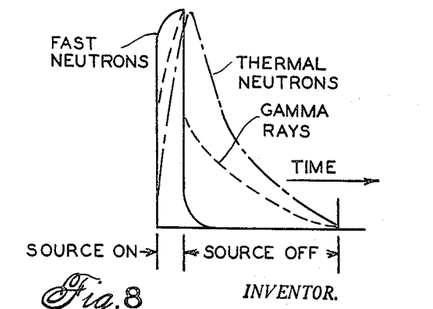
FIGURE 8 illustrates the variation of parameters for still another mode of operation.

For some purposes it is useful to have the source off more than on. This mode of operation is illustrated in FIGURE 8.

As above described, the object of this invention is to determine the effect of the formations upon the lifetime of neutrons emitted by a periodic source. During each cycle a given number of neutrons are emitted, slowed down and captured. If the time the source is on is relatively long, as illustrated in FIGURE 6, many of the neutrons will be captured during the on portion of the cycle, and for a given number of fast neutrons emitted, the number of neutrons or gamma rays detected during the off portion of the cycle depends upon the lifetime of neutrons in the formations; thus, the detectors illustrated in FIGURES 4 and 5 may be turned on during the off portion of the neutron source cycle, and the total processes detected will be indicative of the lifetime of neutrons in the formations. The number of processes detected in any one cycle is very small, but detection occurs during the same portion of each cycle and hence may be accumulated to improve statistical accuracy.

It is not necessary that the detectors detect the slow neutrons and gamma rays over he entire off portion of the neutron source cycle. The number of slow neutrons or gamma rays may be detected over a small portion of the cycle, for the number of slow neutrons present at any particular time is related to the decay of slow neutron population and hence to the lifetime of neutrons in the formations.

Figure 9:
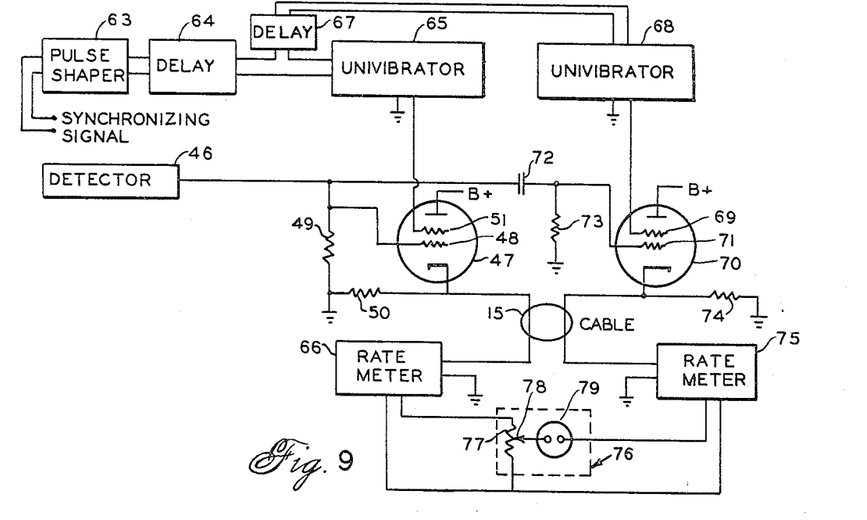
FIGURE 9 is a diagrammatic illustration of means for measuring the lifetime of neutrons.

The number of slow neutrons or gamma rays present at any particular time depends not only upon the lifetime of the slow neutrons, the slowing down time of fast neutrons and the albedo of the formations, but also upon the range of the fast neutrons. In other words, the neutrons emitted from the source penetrate farther in some formations than in others and hence are less likely to produce detection signals. This phenomenon is essentialy what is measured in conventional neutron logs. To eliminate the effect of varying neutrons range, in one form of this invention detection may be made over two different portions of the period when the source is off and the ratio thereof taken. This determines the rate of the decay of thermal neutron population and is not dependent upon the total population. This may be accomplished by utilizing two detecting systems as illustrated in FIGURE 4, sensitive over different portions of the cycle. Alternatively, the single detector 46 may be used with an additional enabling circuit which makes the detecting system sensitive over two different portions of the cycle. This is illustrated in FIGURE 9. A synchronizing signal from oscillator 38 of FIGURE 3 or across resistor 36 of FIGURE 2 is applied to a pulse shaper 63 which produces a sharp pulse in synchronism with the periodic neutron source. The shaped signal is applied through delay circuit 64 to univibrator 65. The combined effect of delay circuit and univibrator is to produce a pulse for a desired portion of the period when the neutron source is off. This signal is applied to the grid 51 of vacuum tube 47, as described in connection with FIGURE 4, to enable the detecting system to operate over the desired portion of the cycle. During this portion of the cycle, the detection signals are passed to the surface through cable 15. There the pulses may be counted by rate meter 66. The delayed signal from delay circuit 64 is further delayed by delay circuit 67 and applied to univibrator 68. The combined effect of delay circuit 67 and univibrator 68 is to provide a pulse for another desired portion of the period when the neutron source is off. This signal is applied to grid 69 of tube 70. The signal from detector 46 is also applied to grid 71 of tube 70 through condensor 72 across resistor 73. This tube functions, as described in connection with tube 47, to produce output pulses across cathode resistor 74 during the desired portion of the cycle. These pulses are transmitted up the cable 15 to rate meter 75 where the pulses are counted. The outputs of rate meters 66 and 75 are applied to ratio taking unit 76 which may comprise a self-balancing potentiometer. The larger signal, from rate meter 66, is applied across resistor 77 of the self-balancing potentiometer, and the lesser signal, from rate meter 75, is applied with proper polarity from one end of resistor 77 to the sliding contact 78 through galvanometer 79. The conventional self-balancing potentiometer is constructed to that sliding contact 78 is moved to the position on resistor 77 where there is no current in galvanometer 79. At this position the potentiometer is balanced and the ratio of that part of the resistor across which the output of rate meter 75 is applied to the entire resistor 77 across which the output of rate meter 66 is applied is equal to the ratio of the respective voltages. Sliding contact 78 is connected by a mechanical linkage to a recording pen mechanism which makes a record of the ratio of the outputs of rate meters 75 and 66. If desired, additional information may be recorded by also recording the signals themselves.

Although but two channels are shown in FIGURE 9, any desired number may be used. It is possible to detect during separate consecutive intervals over the entire cycle and record for each separate interval. From this the curves of FIGURES 6, 7, and 8, may be derived. Different parts of each curve depend upon different particular characteristics of the formations and, therefore, a knowledge of the entire curves will provide additional information regarding the formations. In particular, the initial part of the gamma ray curves depends upon fast neutron reactions and, therefore, indicates the interactions of the formations with fast neutrons. The peak of the thermal neutron population is dependent upon the range of neutrons; measurements of this are essentially the same as conventional neutron logs. Since gamma ray population depends upon both fast and slow neutron processes, by measuring gamma rays and slow neutrons separately, the fast neutron interactions may be measured. After the source is off the rate of decay depends initially upon the slowing down time of the fast neutrons as well as the lifetime of the slow neutrons in the formations and the albedo of the formations. Once most of the neutrons have been thermalized, the rate of decay depends solely upon the lifetime of the thermal neutrons and the albedo of the formations. The ratio of two measurements made after most of the neutrons have been thermalized, indicates the lifetime of neutrons in the formations. Thus, by making measurements over several intervals while the source is off, the ratios of these measurements may indicate separately the slowing down time and the combined effect of lifetime of neutrons in the formations and the albedo of the formations.

Figure 10:
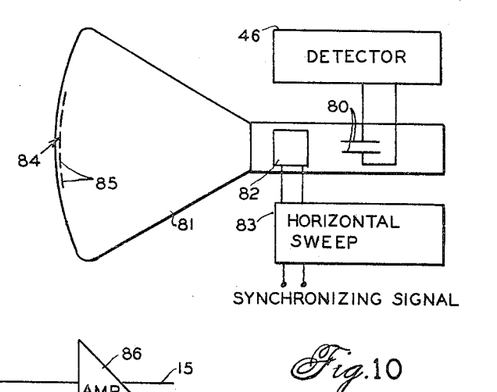
FIGURE 10 is a diagrammatic illustration of cathode ray tube means for measuring the lifetime of neutrons.

In FIGURE 10 there is illustrated another means for analyzing the neutron or gamma ray population during the cycle of a periodically varying neutron source. Detector 46 is again a pulse type detector of either thermal neutrons or gamma rays. In this form of the invention the output of detector 46 is continuously applied to vertical deflecting plates 80 of a cathode ray tube 81 having a conventional electron-gun mechanism. The horizontal sweep voltage is applied to horizontal deflection plates 82 from source 83 which has the same period as the neutron source and is synchronized with the neutron source by the voltage from relay circuit 45 of FIGURE 3 or across resistor 36 of FIGURE 2. The horizontal sweep voltage is thereby synchronized to cause the electron beam of cathode tube 81 to sweep linearly across target 84 for each cycle of the neutron source, beginning with the turning on of the source.

Figure 11:
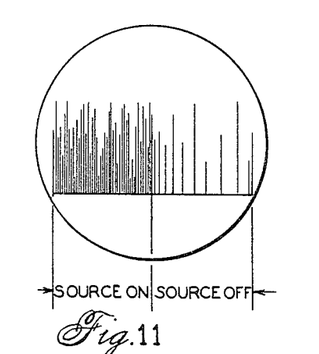
FIGURE 11 illustrates the trace of the electron beam of the cathode ray tube shown in FIGURE 10.

In FIGURE 11 there is illustrated the trace of the electron beam on the target. While the source is on, there are many vertical pulses produced by the application of detection signal pulses to the vertical deflecting plates 80. The height of the pulses on the target is determined by the detection signals in the case of gamma ray detection; however, in the case of neutron detection the pulses may be of uniform height. When the source is off, the number of pulses decreases toward the end of the cycle.

Figure 12:
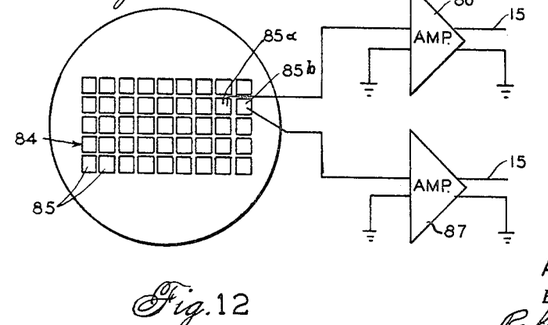
FIGURE 12 illustrates the target plates of the cathode ray tube shown in FIGURE 10.

In FIGURE 12 is shown one form of the target 84 composed of a mosaic of small conducting plates 85. The detecting plates 85 are arranged so that each covers a particular range of time and pulse height. In other words detection signal pulses occurring during a particular time interval and having a particular pulse height cause the electron beam to impinge upon a particular plate 85. When the particular plate is electrically connected to an output circuit, electrical pulses are derived which are indicative of detection pulses occurring during the interval and having the height covered by a particular plate. Thus a particular plate 85a is shown coupled to amplifier 86 which amplifies the pulses before they are applied to the cable 15 for transmission to the surface. Cathode ray tube 81 with its mosaic target 84 therefore functions in the fashion of the apparatus shown in FIGURE 9 to provide separate channels for the detecting system, each operating over a different interval of time. Thus, plate 85b may be connected to amplifier 87 and the amplified signal sent to the surface of the earth through cable 15. The two signals may then be applied to ratio taking unit 76 and the resultant ratio recorded as indicative of the lifetime of neutrons in the formations. Further, the mosaic target provides means for separating the pulses according to pulse height.

As an alternative to a cathode ray tube with a mosaic target, a conventional cathode ray tube with a fluorescent screen may be used with photocell pickups focussed upon particular portions of the screen. The photocell outputs may be used in the fashion of the outputs from the plates of the mosaic target.

An alternative to transmitting detection pulses up the cable is to have the counting rate meters in the subsurface apparatus and send the integrated signal to the surface.

Although either gamma ray detection or thermal neutron detection alone are within the scope of this invention, each measurement has advantages, and it is preferred to detect both. Measurement of gamma rays during the time the source is off has the advantages over detection while the source is on and hence over conventional logging in that gamma rays arising in the source and gamma rays arising from fast neutron processes are not detected. The former factor particularly confuses an attempt to log the effect of neutrons on the formations. In this invention gamma ray detection has advantages over neutron detection because the depth of sampling is in general greater and because the neutron flux in and near the borehole is rapidly reduced by the borehole fluid so that measurements of gamma ray flux made during the later portion of the off interval are substantially unaffected by the borehole fluid, well casing and instrument housing. Moreover, gamma rays are not attenuated as much by the casing, housing and borehole fluid as are thermal neutrons and may, therefore, be more efficiently detected. Thermal neutron detection has an important advantage over gamma ray detection because it ignores the effects of activation and natural gamma rays. Bombardment of the formations with neutrons causes certain materials to become artificially radioactive and produce delayed gamma rays which tend to obscure measurements of gamma rays produced upon neutron capture.

Whichever type or types of radiation are detected, this invention includes selective detecting or measuring during one or more selected portions of the time the periodic neutron source is off, but does not exclude such detecting or measuring in combination with detecting or measuring during the time the source is on.

It is to be understood that this invention is not to be limited to the specific modifications described but is to be limited only by the following claims.

I claim:

1. A method of geophysical prospecting that comprises irradiating the formations surrounding a well with neutrons, periodically substantially interrupting the neutron irradiation, and measuring the rate of decrease in neutron population during the time said neutron irradiation is interrupted.

2. A method of geophysical prospecting that comprises irradiating the formations surrounding a well with neutrons, periodically substantially interrupting the neutron irradiation, and during at least one selected portion of the cycyle selectively measuring the rate of decline of gamma radiation of at least one selected energy range occasioned by neutron irradiation.

3. A method of geophysical prospecting that comprises irradiating the formations surrounding a well with neutrons, periodically substantially interrupting the neutron irradiation, during at least two selected portions of the cycle selectively measuring radiation occasioned by said neutron irradiation, and measuring at least one ratio of the selective measurements.

4. A method of geophysical prospecting that comprises irradiating the formations surrounding a well with neutrons, periodically substantially interrupting the neutron irradiation, during at least two selected portions of the cycle selectively measuring gamma radiation of at least one selected energy range occasioned by said neutron irradiation, and measuring at least one ratio of the selective measurements.

5. A method of geophysical prospecting that comprises irradiating the formations surrounding a well with neutrons, periodically substantially interrupting the neutron irradiation for from 20 to 2000 microseconds, and during at least one selected portion of the cycle selectively measuring the rate of decline of radiation occasioned by said neutron irradiation.

6. A method of geophysical prospecting that comprises irradiating the formations surrounding a well with neutrons, periodically substantially interrupting the neutron irradiation for from 1 to 5 times average lifetime of neutrons in formations normally encountered, and during at least one selected portion of the cycle selectively measuring radiation occasioned by said neutron irradiation.

7. A method of geophysical prospecting that comprises irradiating the formations surrounding a well with neutrons, periodically substantially interrupting the neutron irradiation for from 1 to 5 times average lifetime of neutrons in the formations of interest, and during at least one selected portion of the cycle selectively measuring radiation occasioned by said neutron irradiation.

8. A method of geophysical prospecting that comprises irradiating the formations surrounding a well with neutrons, periodically substantially interrupting the neutron irradiation for a time approxiamtely equal to the longest average lifetime of neutrons in any formations normally encountered, and during at least one selected portion of the cycle selectively measuring radiation occasioned by said neutron irradiation.

9. A method of geophysical prospecting that comprises irradiating the formations surrounding a well with neutrons, periodically substantially interrupting the neutron irradiation for from 1 to 5 times average lifetime of neutrons in oil, and during at least one selected portion of the cycle selectively measuring radiation occasioned by said neutron irradiation.

10. A radioactivity well logging system that comprises an instrument housing adapted to be raised and lowered in a well, a source of neutrons within said housing, interrupting means for periodically substantially interrupting the emission of neutrons by said source, and a measuring system synchronized therewith which comprises at least one transducer of radiation also within said housing which produces electrical pulses systematically related to radiation incident thereon, means for selecting such pulses produced during at least two selected portions of the cycle, means for deriving direct current signals respectively proportional to the number of said pulses in each of said portions, and means for measuring at least one ratio of said direct current signals.

11. A radioactivity well logging system that comprises an instrument housing adapted to be raised and lowered in a well, a source of neutrons within said housing, interrupting means for periodically substantially interrupting the emission of neutrons by said source, and a measuring system synchronized therewith which comprises at least one gamma ray detector also within said housing which produces electrical pulses of heights systematically related to the energies of gamma rays incident thereon, means for selecting such pulses produced during at least two selected portions of the time said neutron emission is interrupted and having heights indicative of at least one selected energy range, means for deriving direct current signals respectively proportional to the number of said pulses in each of said portions, and means for measuring at least one ratio of said direct current signals.

12. A method of geophysical prospecting that comprises irradiating the formations surrounding a well with neutrons, periodically substantially interrupting the neutron irradiation, and selectively measuring irradiation occasioned by said neutron irradiation during at least one selected portion of the cycle not including any substantial portion during which the neutron irradiation is uninterrupted.

13. A method of geophysical prospecting that comprises irradiating the formations surrounding a well with neutrons, periodically substantially interrupting the neutron irradiation, selectively measuring radiation occasioned by said neutron irradiation during a selected portion of the cycle not including any substantial portion of the cycle when the neutron irradiation is uninterrupted, separately measuring radiation occasioned by said neutron irradiation during a second selected portion of the cycle, and measuring the ratio of the selective measurements.

14. A method of exploring earth formations which comprises the steps of: irradiating the formations with neutrons during repetitive, relatively short intervals of time thereby to define successive operating cycles, each including an irradiation interval followed by a quiescent interval, and each such quiescent interval including a first period wherein neutrons may slow down, diffuse, and experience capture reactions with nuclei in atoms of the formations as manifested by a characteristic neuclear phenomenon, respectively, and a second period wherein radioactive elements formed by neutron interactions may exhibit a product of radioactive decay; and detecting a nuclear phenomenon uniquely characteristic of a selected interaction between said neutrons and the formations only during repetitive, relatively short observation intervals, each occurring within a portion of one of said operating cycles including said irradiation interval and said first period when said nuclear phenomenon would be expected to occur.

15. A method of exploring earth formations which comprises the steps of: irradiating the formations with neutrons during repetitive, relatively short irradiation intervals; and detecting a nuclear phenomenon uniquely characteristic of a selected interaction between said neutrons and the formations only during relatively short observation intervals, each relatively closely related in timing to one of said irradiation intervals, when said nuclear phenomenon would be expected to occur.

16. A method of exploring earth formations which comprises the steps of: irradiating the formations with neutrons during repetitive, relatively short irradiation intervals; and detecting gamma radiation resulting from inelastic scattering of neutrons only during relatively short observation intervals, each relatively closely related in timing to one of said irradiation intervals, when said gamma radiation would be expected to occur.

17. A method of exploring earth formations which comprises the steps of: irradiating the formations with neutrons during repetitive, relatively short irradiation intervals; and detecting gamma radiation of a selected energy resulting from inelastic scattering of neutrons only during relatively short observation intervals, each occurring in a period including one of said irradiation intervals and a successive, relatively short interval, when said gamma radiation would be expected to occur.

18. A method of exploring earth formations which comprises the steps of: irradiating the formations with neutrons during repetitive, relatively short intervals of time thereby to define successive operating cycles, each including an irradiation interval followed by a quiescent interval, and each such quiescent interval including a first period wherein neutrons may slow down, diffuse and experience capture reactions with nuclei in atoms of the formations and a second period wherein radioactive elements formed by neutrol interactions may exhibit a product of radioactive decay; and detecting a nuclear phenomenon uniquely characteristic of a selected interaction between said neutrons and the formations only during a portion of said first period, when said phenomenon would be expected to occur.

19. A method of exploring earth formations which comprises the steps of: irradiating the formations with neutrons during repetitive, relatively short intervals of time thereby to define successive operating cycles, each including an irradiation interval followed by a quiescent interval, and each such quiescent interval including a first period wherein neutrons may slow down, diffuse and experience capture reactions with nuclei in atoms of the formations and a second period wherein radioactive elements formed by neutron interactions may exhibit a product of radioactive decay; and obtaining indications of the time within said first period wherein a selected nuclear phenomenon uniquely characteristic of a selected interaction between said neutrons and the formations exhibits a maximum effect.

20. A method of exploring earth formations which comprises the steps of: irradiating the formations with neutrons during repetitive, relatively short intervals of time thereby to define successive operating cycles, each including an irradiation interval followed by a quiescent interval, and each such quiescent interval including a first period wherein neutrons may slow down, diffuse and experience capture reactions with nuclei in atoms of the formations and a second period wherein radioactive elements formed by neutron interactions may exhibit a product of radioactive decay; and detecting neutrons having a selected energy corresponding to the energy the resultant flux of neutrons would have as a result of a uniquely characteristic interaction between said radiating neutrons and the formations only during relatively short observation intervals, each included within one of said first periods, when said resultant flux would be expected to occur.

21. A method of exploring earth formations which comprises the steps of: irradiating the formations with neutrons during repetitive, relatively short intervals of time thereby to define successive operating cycles, each including an irradiation interval followed by a quiescent interval, and each such quiescent interval including a first period wherein neutrons may slow down, diffuse and experience capture reactions with nuclei in atoms of the formations and a second period wherein radioactive elements formed by neutron interactions may exhibit a product of radioactive decay; and obtaining indications of the timing relationship of the occurrence of a characteristic of neutrons slowed to thermal energies, relative to said irradiation intervals, and occurring during each of said first periods.

22. A method of exploring earth formations which comprises the steps of: irradiating the formations with neutrons during repetitive, relatively short intervals of time thereby to define successive operating cycles, each including an irradiation interval followed by a quiescent interval, and each such quiescent interval including a first period wherein neutrons may slow down, diffuse and experience capture reactions with nuclei in atoms of the formations and a second period wherein radioactive elements formed by neutron interactions may exhibit a product of radioactive decay; and detecting gamma radiation resulting from neutron capture only during relatively short observation intervals, each occurring within one of said first periods, when said gamma radiation would be expected to occur.

23. A method of exploring earth formations which comprises the steps of: irradiating the formations with neutrons during repetitive, relatively short intervals of time thereby to define successive operating cycles, each including an irradiation interval followed by a quiescent interval, and each such quiescent interval including a first period wherein neutrons may slow down, diffuse and experience capture reactions with nuclei in atoms of the formations and a second period wherein radioactive elements formed by neutron interactions may exhibit a product of radioactive decay; and obtaining indications of the time within said first period wherein gamma radiation resulting from neutron capture is a maximum.

24. A method of exploring earth formations traversed by a borehole which comprises the steps of: irradiating the formations with neutrons during relatively short, time-spaced irradiation intervals to produce atoms having compound nuclei; detecting a selected nuclear phenomenon resulting promptly from such compound nuclei and uniquely characteristic of a specific interaction between said neutrons and the formations only during relatively short detection intervals so timed relative to said irradiation intervals as to exclude detection of effects other than said selected nuclear phenomenon; and obtaining indications of said selected nuclear phenomenon as a function of depth in the borehole.

25. A method of exploring earth formations which comprises the steps of: irradiating the formations with neutrons of relatively high energy capable of effecting inelastic collisions with nuclei of atoms thereby to produce atoms having compound nuclei; and detecting gamma radiation occuring promptly relative to the production of such compound nuclei which is uniquely characteristic of a specific interaction between said neutrons and the formations only during an interval when said gamma radiation would be expected to occur.

26. A method of exploring earth formations which comprises the steps of: irradiating the formations with neutrons of relatively high energy capable of effecting inelastic collisions with nuclei of atoms thereby to produce atoms having compound nuclei; and indicating gamma radiation having a pre-determined energy level and occurring promptly relative to the production of said compound nuclei only during a time interval in which said gamma radiation would be expected to occur.

27. A method of exploring earth formations which comprises the steps of: irradiating the formations with neutrons of relatively high energy to produce atoms having compound nuclei through a process wherein those of said neutrons slowed by formation material to thermal energy levels are captured by respective nuclei; and indicating gamma radiation occurring promptly relative to the production of such compound nuclei only during an interval in which such gamma radiation would be expected to occur.

28. A method of exploring earth formations which comprises the steps of: irradiating the formations with neutrons of relatively high energy to produce atoms having compound nuclei through a process wherein those of said neutrons slowed by formation material to thermal energy levels are captured by respective nuclei; and indicating gamma radiation having a pre-determined energy level and occurring promptly relative to the production of such compound nuclei only during a time interval in which said gamma radiation would be expected to occur.

29. Apparatus for exploring earth formations traversed by a borehole comprising: a source of neutron pulses; and a detection system including means movable with said source and responsive to a nuclear phenomenon resulting from irradiation of the formations by neutrons, and means coupled to said first mentioned means for indicating a characteristic of said nuclear phenomenon, and means for selectively operating said detection system substantially only during observation intervals, each occurring within a period including a neutron pulse and terminating prior to the occurrence of a product representing radioactive decay of a radioactive element formed by neutron capture in which said nuclear phenomenon would be expected to occur.

30. A method of testing material which comprises the steps of: irradiating a sample of material with neutrons during a short interval of time to define an irradiation interval, a first period following said interval and terminated by neutron capture reactions with nuclei in atoms of the sample of material, and a second period following said first period wherein radioactive decay products may be exhibited; and obtaining indications of a phenomenon uniquely representative of a specific interaction between said neutrons and the material occurring in the sample of material during an observation interval disposed in time within a period including said irradiation interval and said first period, to the exclusion of said second period.

31. A method of testing material which comprises the steps of: irradiating a sample of material with neutrons during repetitive, relatively short intervals of time thereby to define successive operating cycles, each including an irradiation interval followed by a quiescent interval, and each such quiescent interval including a first period wherein neutrons may slow down, diffuse and experience capture reactions with nuclei in atoms of the sample of material and a second period wherein radioactive elements formed by neutron interactions may exhibit a product of radioactive decay; and obtaining indications of a nuclear phenomenon uniquely characteristic of a specific interaction between said neutrons and the material occurring in the sample of material during a portion of one of said operating cycles including said irradiation interval and said first period, to the exclusion of said second period.

32. A method of testing material which comprises the steps of: irradiating a sample of material with neutrons during repetitive, relatively short intervals of time thereby to define successive operating cycles, each including an irradiation interval followed by a quiescent interval, and each such quiescent interval including a first period wherein neutrons may slow down, diffuse and experience capture reactions with nuclei in atoms of the sample of material and a second period wherein radioactive elements formed by neutron interactions may exhibit a product of radioactive decay; and obtaining indications of a nuclear phenomenon uniquely characteristic of a specific interaction between said neutrons and the material occurring in the sample of material during an observation interval in a portion of one of said operating cycles including said irradiation interval and said first period, to the exclusion of said second period, when said phenomenon would be expected to occur, said observation interval having a relatively short duration compared to said first period.

33. A method of testing material which comprises the steps of: irradiating a sample of material with neutrons during a short interval of time to define an irradiation interval, a first period following said interval and terminated by neutron capture reactions with nuclei in atoms of the sample of material, and a second period following said first period wherein radioactive decay products may be exhibited; and obtaining indications of the timing relation between a reference point in time and an observation interval wherein a selected nuclear phenomenon uniquely representative of a selected interaction between said neutrons and the material occurs, said observation interval being within a period including said irradiation interval and said first period, to the exclusion of said second period.

34. A method of testing material which comprises the steps of: irradiating a sample of material with neutrons during a short interval of time to define an irradiation interval, a first period following said interval and terminated by neutron capture reactions with nuclei in atoms of the sample of material, and a second period following said first period wherein radioactive decay products may be exhibited; and obtaining indications of the timing relation between a reference point in time and an observation interval wherein neutrons slowed to a predetermined energy by the sample of material arrive at an observation point, said observation interval being within a period including said irradiation interval and said first period, to the exclusion of said second period.

35. A method of exploring earth formations which comprises the steps of: irradiating the formations with neutrons to produce atoms having compound nuclei as evidenced by the occurrence within a given interval of time relative to irradiation of the formations of a characteristic prompt nuclear phenomenon, and detecting said phenomenon only during said interval to the exclusion of similar nuclear phenomena resulting from said irradiation of the formations and occurring outside of said interval.

36. A method of investigating the character of a subsurface earth formation surrounding a borehole containing a substance having a greater neutron capture capability than said formation, said method comprising:
bombarding said substance and said formation with a series of bursts of neutrons,
during the latter portion of the time intervals separating said bursts detecting penetrative radiation emanating from said formation to the substantial exclusion of radiation resulting from neutron bombardment of said substance in said borehole.

37. A method of investigating the character of a subsurface earth formation surrounding a borehole containing a substance having a greater neutron capture capability than said formation, said method comprising:
bombarding said substance and said formation with a series of bursts of neutrons,
after each such bombardment and during the latter portion of the time intervals separating said bursts detecting penetrative radiation emanating from said formation to the substantial exclusion of radiation resulting from neutron bombardment of said substance in said borehole.

38. A method of geophysical prospecting in a borehole containing a substance having a measurably different capturing power for neutrons than that of average earth formations, said method comprising the steps of:
passing through said borehole an instrument containing a pulsing source of neutrons and a detector of penetrative radiation which emanates from said formations as a result of neutron bombardment.
irradiating said substance and said formations with a pulse of neutrons to produce penetrative radiations from said substance and said formations during a first time interval and substantially only radiations from said formations during a second later time interval, and
detecting radiations produced in said formations during said second time interval to the substantial exclusion of said radiations produced in said substance.

39. In a method of geophysical prospecting an earth formation traversed by a fluid-containing borehole, the combination of steps that comprises:
traversing the borehole in the vicinity of a formation about which information is desired with an instrument comprising:
a source of radioactive radiation and a detector of radiation returning from the formation as a result of exposure to said radioactive radiation,
subjecting the formation to said radiation for a predetermined time interval,
discontinuing irradiation of the formation,
maintaining said detector inoperative during said radiation time interval and for a short period thereafter of sufficient duration to permit decay of substantially all interfering radiation emitted from the borehole contents including said fluid as a result of said irradiation, then activating and maintaining the detector operative during a further period of time during discontinuance of said irradiation, and selectively detecting penetrative radiation emitted from the formation as a result of said irradiation.

40. In a method of geophysical prospecting an earth formation traversed by a fluid-containing borehole, the combination of steps that comprises:

traversing the borehole in the vicinity of a formation about which information is desired with an instrument comprising:

a source of radioactive radiation and a detector of radiation returning from the formation as a result of exposure to said radioactive radiation, subjecting the formation to said radiation for a predetermined time interval, discontinuing irradiation of the formation, maintaining said detector inoperative during said irradiation time interval and for a short period thereafter of sufficient duration to permit decay of substantially all interfering radiation emitted from the fluid in the borehole as a result of said irradiation by said source, then activating and maintaining the detector operative during a further period of time during discontinuance of said radiation, selectively detecting penetrative radiation emitted from the formation substantially only during the lifetime of neutrons from said source in said formation, and continuously repeating the foregoing sequence of steps during traversal of the formation.

41. A method of geophysical prospecting in a borehole containing a substance which has a measurably different capturing power for neutrons than that of average earth formations, said method comprising:

traversing an earth formation which surrounds said borehole and about which information is desired with an instrument containing:

a neutron source and a detector of penetrative radiation which emanates from the formation as a result of neutron bombardment thereof, bombarding said substance and said formation with neutrons whereby the intensity of the radiation emitted from said substance as a result of such irradiation will be of maximum intensity during a first time interval following irradiation and whereby the radiation emitted from the earth formation as a result of irradiation will be of maximum intensity during a second time interval following irradiation, said second time interval being different than said first time interval due to the different capturing power of said substance than of average earth formations, detecting the resultant penetrative radiation substantially only during said second time interval to the substantial exclusion of said first time interval and which occurs substantially only during the lifetime of neutrons from said source in said formation whereby the detected radiation is predominately due to radiation emanating from the formation exposed to said bombardment while minimizing the detection of radiation resulting from the substance.

42. A method of geophysical prospecting in a borehole containing a substance which has a substantially greater capturing power for neutrons than that of average earth formations whereby the intensity of the radiation emitted from said substance as a result of irradiation will be of maximum intensity during a first time interval following irradiation and whereby the radiation emitted from the earth formations surrounding said borehole as a result of irradiation will be of maximum intensity during a second time interval following irradiation, said second time interval being subsequent to said first time interval due to the greater capturing power of said substance than of average earth formations, said method comprising:

traversing a formation surrounding said borehole about which information is desired with an instrument containing a neutron source and a detector of penetrative radiation which emanates from the formation as a result of neutron bombardment, bombarding the formation with neutrons from the source, and detecting resultant penetrative radiation substantially only during said second time interval to the substantial exclusion of said first time interval and whereby the detected radiation is predominately due to radiation emanating from the formation exposed to said bombardment while minimizing the detection of radiation resulting from the substance.

43. In a method of geophysical prospecting in a borehole containing a substance which has substantially greater capturing power for neutrons than that of average earth formations, said method comprising:

traversing a formation surrounding said borehole about which information is desired with an instrument comprising:

a source of neutrons and a detector of penetrative radiation which emanates from the formation as a result of neutron bombardment thereof, deactivating said detector, irradiating the formation with neutrons from the source for a predetermined time interval, maintaining said detector deactivated during said irradiation and for a period of time after said irradiation at least equal to the lifetime of said neutrons in said substance, thereafter activating and maintaining said detector operative during a predetermined period of time, and detecting penetrative radiation emanating from the formation which strikes the detector substantially only during the lifetime of neutrons from said source in said formation.

44. A method of geophysical prospecting in a borehole containing a substance which has a substantially greater capturing power for neutrons than that of average earth formations, said method comprising the steps of:

traversing the formations surrounding said borehole with an instrument containing a source of neutrons and a detector of penetrative radiation which emanates from the formation as a result of neutron bombardment thereof, deactivating said detector, irradiating said substance and said formations surrounding said borehole with neutrons from said source for a predetermined time interval, maintaining said detector deactivated after such irradiation for a period of time at least equal to the lifetime of said neutrons in said substance, and thereafter activating said detector and detecting only that resultant penetrative radiation which arrives at said detector after a delay time greater than the average time of neutron capture in said substance and less than five times the average time for neutron capture in the formations.

45. In a method of geophysical prospecting in a borehole containing a substance in which the lifetime of a neutron is measurably shorter than its lifetime in a fluid-bearing earth formation surrounding said borehole, said method comprising the steps of:

traversing said formation with an instrument containing a source of radioactive radiation and a detector of radiation returning from said formation as a result of exposure to said radioactive radiation, subjecting said substance and said formation to said radioactive radiation for a first predetermined time interval, maintaining said detector deactivated during said first time interval and for a second predetermined time interval having a duration at least as long as the lifetime of substantially all of said radioactive radiations in said substance, thereafter activating said detector during a predetermined period of time, and detecting penetrative radiation from said formation substantially only during the lifetime of said radioactive radiations in said formation.

46. In a method of geophysical prospecting in a borehole containing a substance in which lifetime of a thermal neutron is shorter than its lifetime in hydrogenous material, said method comprising the steps of:

traversing an earth formation surrounding said borehole about which information is desired with an instrument comprising:

a source of radioactive radiation and a detector of radiation returning from the formation as a result of exposure to said radioactive radiation, subjecting the formation to said radiation for a predetermined time interval, maintaining said detector deactivated during said radiation time interval and for a predetermined time interval following the termination of said radiation, thereafter activating and maintaining said detector operative during a predetermined period of time, and detecting penetrative radiation from the formation which strikes the detector substantially only during the lifetime of neutrons from said source in said formation.

47. In the logging of a fluid-containing borehole traversing at least one earth formation about which information is desired and also containing a substance in which the average lifetime of a thermal neutron population is shorter than the average lifetime of said population in hydrogenous material, said method comprising:

passing through said borehole a source of neutrons and a detector of radiations resulting from neutron irradiation of said formation, causing said source to emit a burst of neutrons for irradiating said earth formation about which information is desired, subsequent to the termination of said neutron burst and only after a further time interval substantially corresponding to the lifetime of the portion of said thermal neutron population in said substance detecting radiation emitted from the formation as a result of said burst, wherefore said detected radiation is due substantially entirely to the effect of said burst on the material of the formation including its hydrogen content to the substantial exclusion of interfering radiation due to the contents of the borehole and which might otherwise be detected.

48. The method of claim 47 wherein the detector is primarily sensitive to gamma radiation resulting from irradiation of the formation with neutrons.

49. In the logging of a fluid-filled borehole traversing at least one earth formation about which information is desired and also containing a substance in which the average lifetime of a neutron is shorter than its average lifetime in average earth formations, the method comprising the steps of:

passing through said borehole a source of neutrons and a detector of radiation resulting from irradiation of an earth formation by neutrons from said source, causing said source to emit a burst of neutrons for irradiating an earth formation about which information is desired, subsequent to the termination of said neutron burst and only after a further time interval substantially corresponding to the lifetime of the portion of said burst of neutrons occupying said borehole detecting radiation emitted from the formation as a result of said burst, wherefore said detected radiation is due substantially entirely to the effect of said burst on the formation to the substantial exclusion of interfering radiation due to the contents of the borehole and which otherwise might be detected.

50. In the logging of a fluid-containing borehole traversing at least one earth formation about which information is desired, the method which comprises:

passing through said borehole a source of neutrons and a detector of radiation resulting from irradiation of an earth formation by neutrons from the source, causing said source to emit a burst of neutrons for irradiating an earth formation about which information is desired, subsequent to the termination of said neutron burst and after a further time interval substantially corresponding to the lifetime of the portion of said neutrons which are in said fluid contents of the borehole detecting radiation emitted from the formation substantially only during the lifetime of neutrons from said source in said formation as a result of said burst to the substantial exclusion of interfering radiation emitted from the fluid contents of the well during said burst and further time interval, wherefore said detected radiation is due substantially entirely to the effect of said burst on the formation.

51. The method of claim 47 wherein the detector is primarily sensitive to neutron radiation resulting from irradiation of the formation with neutrons.

52. The method of logging at least one earth formation traversed by a borehole containing a fluid which has as one of its constituents a substance which has a substantially time dependent neutron characteristic than said earth formation whereby the time dependent neutron characteristic of the fluid contents of the borehole including said substance is substantially different from the time dependent neutron characteristic of said earth formation so that the intensity of certain radiation emitted from said contents as a result of neutron irradiation thereof will be of maximum intensity during a first time interval following irradiation thereof and whereby said radiation emitted from said earth formations as a result of neutron irradiation thereof will be of maximum intensity during a second time interval, said first time interval different from said second time interval, said method comprising the steps of:

irradiating the borehole contents including said substance and the adjacent earth formation with a burst of neutrons and detecting radiation resulting from said burst in the borehole substantially only during said second time interval to the substantial exclusion of said first time interval, whereby the detection of the radiation resulting from irradiation of the earth formation is emphasized while the detection of the radiation emanating from the borehole contents is minimized.

53. The method of claim 52 wherein the detected radiation comprises gamma rays.

54. The method of logging at least one earth formation traversed by a fluid containing borehole which contains as a constituent of the borehole fluid a substance which has a substantially different time dependent neutron characteristic than said earth formation, whereby the time dependent neutron characteristic including the average lifetime of a neutron in the fluid contents of the borehole including said substance is substantially different from the time dependent neutron characteristic including the average lifetime of a neutron in said earth formation so that the intensity of certain radiation emitted from said contents as a result of neutron irradiation thereof will be of maximum intensity during a first time interval, and whereby said radiation emitted from said earth formations as a result of neutron irradiation thereof will be of maximum intensity during a second time interval, said first time interval being different from said second time interval, said method comprising the steps of irradiating the borehole contents including said substance and the adjacent earth formations with a burst of neutrons, and detecting radiation resulting from said burst in the borehole substantially only during said second time interval and substantially only during the lifetime of neutrons from said source in said formation to the substantial exclusion of said first time interval, whereby the detection of the radiation resulting from irradiation of the earth formation is emphasized while the detection of the radiation emanating from the borehole contents is minimized.

55. The method of well logging comprising the steps of: irradiating the formations surrounding a well with a burst of high energy neutrons, measuring the rate of decline of radiations occasioned in said formations by said burst of neutrons, and recording said measurement in correlation with an indication of depth.

56. The method described in claim 55, wherein said radiations are neutrons.

57. The method described in claim 55, wherein said radiations are gamma rays.

58. Apparatus for investigating the character of earth substances and the like, said apparatus comprising:
means for irradiating said substances with a burst of neutrons, and
means for detecting and measuring the rate of decline of radiations occasioned in said irradiated substances by said burst of neurtons.

59. Apparatus for investigating the character of earth substances traversed by a borehole, said apparatus comprising:
means for irradiating said substances with a burst of neutrons,
detecting means for detecting radiations emanating from said irradiated substances,
means for counting radiations detected by said detecting means during at least one preselected time interval following the initiation of said burst of neutrons, and
measuring means connected with said counting means for measuring the rate of decline of said detected radiations.

60. Apparatus as described in claim 59, wherein said detected radiations are neutrons.

61. Apparatus as described in claim 59, wherein said detected radiations are gamma rays.

62. The method of well logging comprising the steps of:
irradiating the formations surrounding a well with a burst of high energy neutrons,
measuring the rate of decline of said neutrons in said formations, and
recording said measurement in correlation with an indication of depth.

63. The method of well logging comprising the steps of:
pulsedly irradiating the formations surrounding a well with repetitive discrete bursts of high energy neutrons,
measuring the rate of decline of at least a representative portion of each of each of said bursts of neutrons in said formations, and
recording said measurement in correlation with an indication of depth.

64. Apparatus for well logging comprising:
a source of neutrons,
at least one radiation detector spaced from said source,
means for operating said source and detector to produce a discrete burst of neutrons and to detect radiations representing the rate of decline of said neutrons in a medium, and
recording means interconnected with said detector.

References Cited

UNITED STATES PATENTS

| | | | |
|---|---|---|---|
| 2,275,748 | 3/1942 | Fearon | 250—83 |
| 2,303,688 | 12/1942 | Fearon | 250—83 |
| 2,678,400 | 5/1954 | McKay | 250—83.3 X |
| 2,686,268 | 8/1954 | Martin et al. | 250—83.3 X |
| 2,712,081 | 6/1955 | Fearon et al. | 250—83.6 |
| 2,769,096 | 10/1956 | Frey | 250—83.6 |

ARCHIE R. BORCHELT, *Primary Examiner.*

RALPH G. NILSON, *Examiner.*